United States Patent [19]

Wischermann

[11] Patent Number: 4,833,524
[45] Date of Patent: May 23, 1989

[54] SYSTEM FOR TWO-DIMENSIONAL BLENDING OF TRANSITIONS BETWEEN A COLOR VIDEO PICTURE SIGNAL AND A BACKGROUND COLOR SIGNAL

[75] Inventor: Gerhard Wischermann, Weiterstadt, Fed. Rep. of Germany

[73] Assignee: Robert Bosch GmbH, Stuttgart, Fed. Rep. of Germany

[21] Appl. No.: 27,789

[22] Filed: Mar. 19, 1987

[30] Foreign Application Priority Data

Mar. 19, 1986 [DE] Fed. Rep. of Germany ....... 3609135

[51] Int. Cl.$^4$ .............................................. H04N 9/75
[52] U.S. Cl. ...................................... 358/22; 358/325
[58] Field of Search ......................... 358/22, 320, 325; 307/354

[56] References Cited

U.S. PATENT DOCUMENTS 4,365,308 12/1982 Heitmann .............................. 358/22
4,403,245 9/1983 Wischermann ....................... 358/22

Primary Examiner—James J. Groody
Assistant Examiner—Robert M. Bauer
Attorney, Agent, or Firm—Frishauf, Holtz, Goodman & Woodward

[57] ABSTRACT

The magnitude of a chroma-key selected color signal is evaluated for successive pixels in comparison with the previous line as well as in comparison with a previous pixel, for processing a cutover switching signal. A provisional switching signal is produced if either comparison result exceeds a prescribed threshold value. Since it is desired to fade in the foreground signal, it becomes important, if the trailing edge of the provisional signal occurs relatively early, that an adaptive nonrecursive digital filter operating as a color carrier phase shifter should be used to assure prompt transfer of control of the fading in (or fading out) steps to a color carrier phase correction signal present at the input of an intermediate store which operates as a sample and hold circuit. The filter receives successive color control signals for a period controlled by an exclusive OR-gate comparing the delayed and an undelayed provisional switching signal. For providing this operation in both picture dimensions, exclusive-OR gates (8, 9) respectively correlated with pixel and line interval delays are used to control the horizontal (16) and vertical (17) sample and hold circuits which in turn provide color carrier phase correction signals to respective horizontal (18) and vertical (19) nonrecursive filters. The provisional switching signal ($S_d$) is used to produce color corrected switching control signals ($S_{xy}$) by the processing of the vertical filter (19) followed by the processing of the horizontal filter (20).

5 Claims, 2 Drawing Sheets

SYSTEM FOR TWO-DIMENSIONAL BLENDING OF TRANSITIONS BETWEEN A COLOR VIDEO PICTURE SIGNAL AND A BACKGROUND COLOR SIGNAL

This invention relates to a circuit effective to produce a progressive stepwise switching of a digital signal over a plurality of sampling periods for a cut-over between different picture contents.

A circuit of that kind is known from U.S. Pat. No. 4,403,245 and a still earlier circuit of this general kind is shown in U.S. Pat. No. 4,365,308.

The method and circuit of U.S. Pat. No. 4,403,245 has the disadvantage that correctly phased switching signals can be generated only for the horizontal direction. Because of the line-by-line scanning of a television picture, when there is a nearly horizontal cutover edge between a background picture and a foreground picture, the same disturbing alias-like effect occurs in the switching signal of this known circuit as the effect of vertical or oblique cutover edges, such as is overcome by the prior method and circuit.

SUMMARY OF THE INVENTION

It is accordingly an object of the present invention to improve circuits of the above-identified kind in such a way as to make vertical corrections of the switchover signal also possible.

Briefly, additional information regarding the vertical phase error with respect to a comparator signal such as is used for horizontal correction is derived. The magnitude of the selected color signal is evaluated in comparison with the previous line, as well as with respect to the pixels before and after the edge along the line. Since understanding of how this improvement is achieved requires brief review of the circuit of U.S. Pat. No. 4,403,245, further details of the inventions will be set forth only after an introductory description.

BRIEF DESCRIPTION OF THE DRAWINGS

The invention is further described by way of illustrative example with reference to the annexed drawing, in which.

DESCRIPTION OF THE PREFERRED EMBODIMENT

Figure 1:
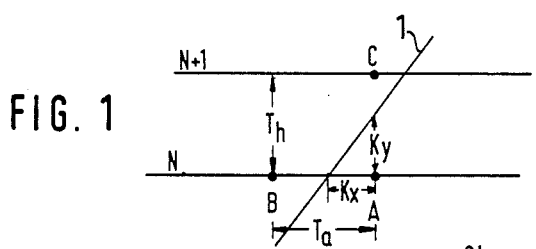
FIG. 1 is a voltage/time diagram illustrating how the correction values are calculated.

Since the present invention uses the basic techniques described in U.S. Pat. No. 4,403,245 above mentioned, it is not necessary to describe in detail the manner in which the time correction signal is derived, but, nevertheless, in connection with FIG. 1 the derivation of time correction signals will be briefly referred to for better understanding of the present invention.

In the so-called "chroma-key" method, a switching signal is derived from a foreground signal for providing a blended transition to an artificial background. In the digital "chroma-key" method, because of the discrete patterning of the pixels (picture element signals) by the sampling procedure, the problem of horizontal detection of cutover edges arises. The selected color signal, which is a measure for approximation of the values Y, U and V to the values $Y_O$, $U_O$ and $V_O$ of the background (e.g., a blue background) is compared with an adjustable threshold value K. When the threshold value is exceeded, it becomes necessary to blend into the artificial background signal. The phase error that then occurs can be determined by the method described in U.S. Pat. No. 4,403,245 and thereafter a corrected switchover signal can be produced that is correct in phase. For that purpose, it is necessary to have a circuit by which the switchover signal can be shifted continuously in its phase position in the horizontal direction in one or a few sampling period steps.

In accordance with the present invention, a similar but necessarily different method is brought into use, along with the known method operating for horizontal correction, for now providing vertical (line-to-line) correction of the switchover signal, because on account of the line-by-line scanning of the television picture, the same disturbing alias-like effect which the horizontal correction overcomes, still remains when the cutover edges are nearly horizontal. In consequence, supplementary information regarding the vertical phase error with reference to the comparator signal must be derived. For this purpose, the value of the selected color signal is evaluated through comparison with the previous line, along with generation of horizontal correction values obtained from pixel values before and after the cutover edge in the new line.

As pointed out in U.S. Pat. No. 4,403,245, switching signals for chroma-keying are derived from a so-called foreground signal for chroma-keying the foreground signal onto a background signal. For this purpose, the digital foreground signal is compared to a threshold value signal and produces a switching pulse $S_d$ which begins when the foreground signal exceeds the threshold value and ends with the first sample that fails to exceed the threshold signal. Since it is desired to fade in the foreground signal, it is important that if the trailing edge of the switching signal occurs relatively early, a non-recursive digital filter should be used which is adaptive in order to insure that immediately an edge (switching signal) of a switching pulse $S_d$ is present, the corresponding value of the time correction signal present at the input of an intermediate storage which operates as a sample and hold circuit is taken into intermediate storage for further control of the fading in and fading out steps. The successive time corrected switchover signals produced by the adaptive digital filter can provide the desired switchover signals shifted continuously in phase position which in the case of the horizontal direction covers a few sampling period steps.

For the horizontal correction according to U.S. Pat. No. 4,403,245, a selected color signal of each instantaneous pixel is compared with the threshold signal to produce the switching signal and a time correction signal based on the inherent delay of the switching signal is put into the intermediate storage that operates as a sample and hold circuit by virtue of loading under control of an exclusive-OR gate.

FIG. 1 shows a part of a television line N-1 and the immediately following line N. An oblique cutover edge 1 lies across these lines and produces a comparator signal. The points ("pixels") A, B and C lie on these television lines in accordance with the scanning pattern, the spacing A–B corresponding to the sampling interval $T_a$ and the spacing A–C corresponding to the television line duration $T_h$. Since the cutover edge 1 does not pass through the points A, B and C, the phase deviation in the horizontal direction $\Delta T_1$ and the phase deviation in the vertical direction $\Delta T_2$ must be determined. The phase deviations are proportional to time. According to the representation of FIG. 1, we then have the equations:

$$\Delta T_1 = \frac{K_X}{T_a} = \frac{A-K}{A-B}$$

and $$\Delta T_2 = \frac{K_y}{T_h} = \frac{A-K}{A-C}.$$

Figure 2:
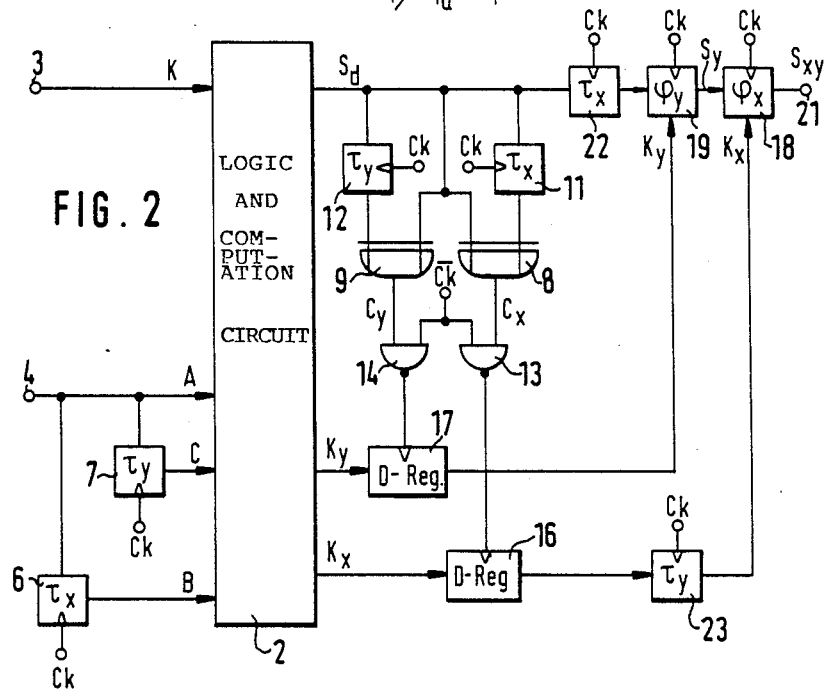
FIG. 2 is a circuit according to the invention for generating the corrected switchover signals.

FIG. 2 is a block circuit diagram for two-dimensional (planar) correction of the switchover signal. A logic and computing unit 2 is supplied with a comparator threshold signal K on a first input terminal 3 of the logic and computing unit 2, while the input terminal 4 of the comparator is supplied with the selected color signal of the instantaneous pixel A. The selected color signal of the preceding pixel B is derived by means of a delay unit 6. By means of a delay unit 7, which delays the signal by a line interval, the selected color signal of the pixel C from the preceding line N-1 is supplied. The delayed signals just mentioned are derived from the undelayed signal on terminal 4 and furnished to separate inputs of the unit 2 as shown in FIG. 2.

In the logic and computing unit 2, there is then derived from these input signals a provisional switching or cutover signal $S_d$ which is equal to 1 for $A \geq K$ and, in addition, the correction signals $K_Y$ and $K_X$ are derived in accordance with the equations given above, as explained below with reference to FIG. 4.

For recognition of a horizontal or a vertical cutover edge, the correlation values $C_X$ or $C_Y$ are derived from provisional or cutover switching signal $S_d$ by means, in each case, of an exclusive-OR gate 8,9. For this purpose, the provisional switching signal $S_d$ is on the one hand delayed by a sampling interval in a delay unit 11 and, on the other hand, delayed by a television line interval by means of a delay unit 12, these being in each case connected with one input of the exclusive-OR gates 8 and 9, and on the other hand the provisional switching signal $S_d$ is supplied directly to the respective other inputs of the gates 8 and 9. The signals $C_X$ and $C_Y$ are then correlated with the complementary sampling pulse $\overline{Ck}$, in each case by means of a NAND gate 13, 14.

If a correlation value $C_X$ or $C_Y$ is present, a timing (color carrier phase control) pulse will be gated out which will in each case be supplied to the clock input of the respective D register 16, 17. The values $C_X$ or $C_Y$ are in each case logic 1 if the provisional switching signal $S_d$ has changed in comparison with the previous pixel or, in the case of $C_Y$, in comparison with the previous line. In any such case, the correction values $K_X$ and/or $K_Y$ are stored in the D registers 16,17 until a new cutover edge appears as shown by change of the provisional switching signal.

The exclusive-OR gates 8 and 9 and their associated circuits correspond to the exclusive-OR gate 32 of FIG. 2 of U.S. Pat. No. 4,403,245 and assure that when a new cut-over edge in the picture appears and generates a new provisional switching signal $S_d$, a new correction value $K_X$ and/or a new correction value $K_Y$ will be stored in the D register 16 and/or the D register 17, respectively. The importance of so doing is explained in the above-identified U.S. Pat. No. 4,403,245. In other words, each time correction value is stored until a following provisional digital switching signal provides another time correction.

The respective correction values $K_X$ and $K_Y$ control horizontal and vertical phase shifters 18 and 19. These phase shifters 18 and 19 are connected in series in such a way that, first, the cut-over or provisional switching signal $S_d$ is supplied to the vertical phase shifter 19 and thereafter the first corrected switching signal $S_y$ is supplied to the horizontal phase shifter 18, so that at the output of the phase shifter 18, a second corrected switching signal $S_{xy}$ are made available at the terminal 21. By this series connection of the phase shifters 19 and 18, the horizontal delay needs to be carried out only for one sampling interval by means of the delay unit 22 in the path of the provisional switching signal $S_d$. For the following horizontal correction by means of the phase shifter 18, the correction value $K_X$ must be delayed by means of the delay unit 23 by one line corresponding to the average propagation time of the vertical phase shifter 19.

The filter 18 is of a construction corresponding to FIG. 2 of U.S. Pat. No. 4,403,245 which includes a PROM to which the correction value $K_x$ is supplied and delivers multiplying factors for the correction signal $S_y$ delivered by the filter 19 while $S_y$ is delayed by progressive increments of one pixel interval in the filter 18. As pointed out in U.S. Pat. No. 4,403,245, these products are added to provide an output which in this case are the corrected cut-over signals $S_{xy}$.

Figure 3:
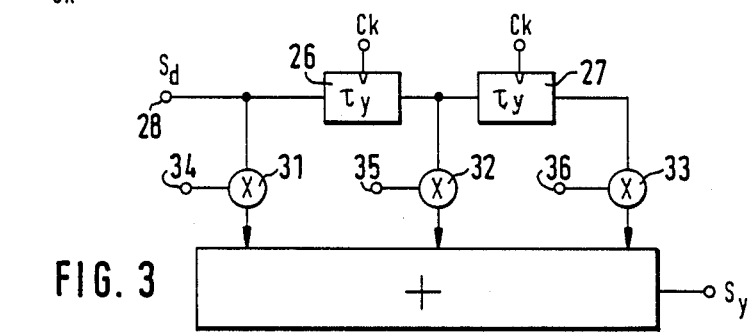
FIG. 3 is a circuit block diagram of a "vertical" phase shifter.

The present FIG. 3 shows an illustrative example of a vertical phase shifter of second order operating in the same manner as the horizontal phase shifter described in the above-mentioned FIG. 2 of U.S. Pat. No. 4,403,245.

In the phase shifter of FIG. 3, however, instead of the pixel interval delays, corresponding line interval delay units 26 and 27 are provided. The provisional switching signal $S_d$ applied to the terminal 28 is thus supplied undelayed, with a one line delay and with a two-line delay to respective multiplier stages 31,32 and 33. To the respective other inputs 34, signals are applied as follows:

To input 34, the factor $K_{y/2}$
To input 35, the factor $\frac{1}{2}$, and
To input 36, the factor $1-K_{y/2}$ where $0 \leq K_y \leq 1$.

As in the case of the filter of FIG. 2 of U.S. Pat. No. 4,403,245, it may be convenient to provide the factors for the inputs 34, 35 and 36 of the multipliers of the filter of the present FIG. 3 from a PROM which is addressed by the correction value $K_y$ obtained from the D register 17.

The outputs of the multiplying stages 31, 32 and 33 are respectively connected to the inputs of an addition stage 37, at the output 38 of which there is made available the first corrected switching signal $S_y$ corrected in the vertical direction.

Figure 4:
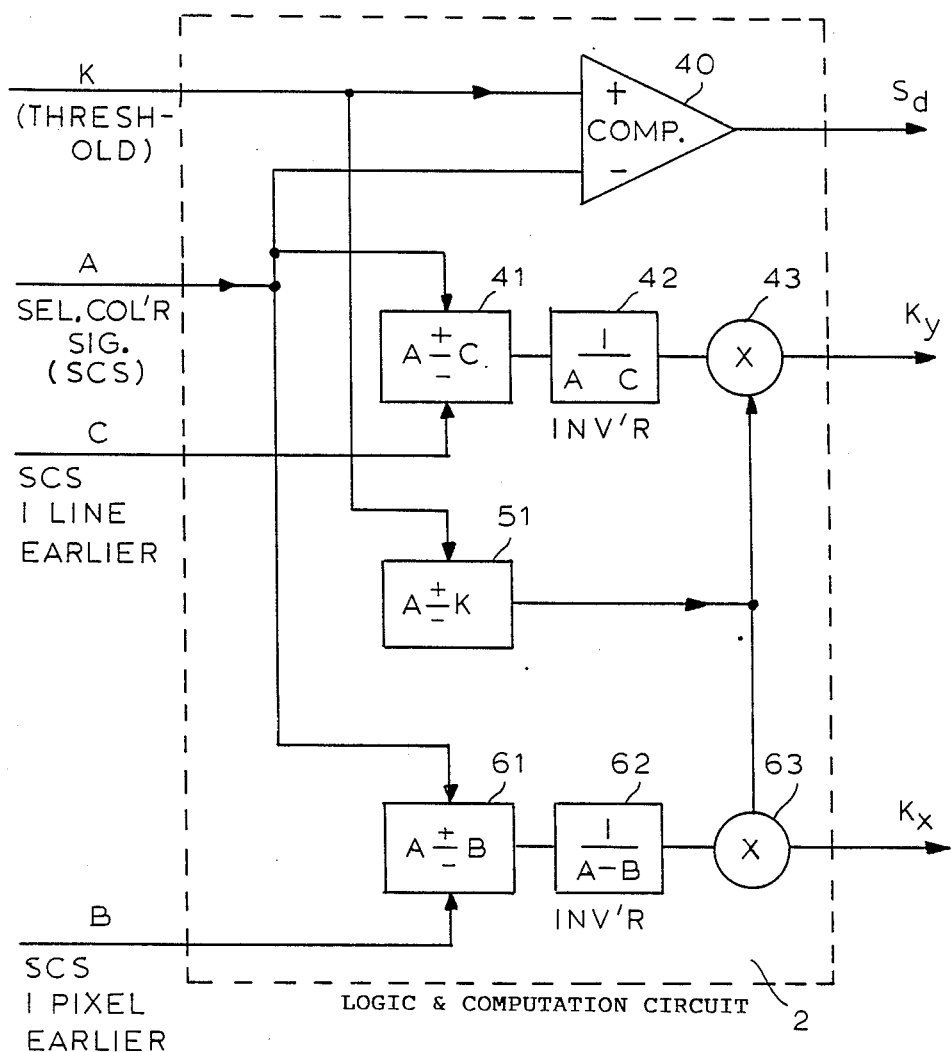
FIG. 4 is a circuit block diagram of the logic and computing unit 2 of FIG. 1.

FIG. 4 is a circuit block logic diagram illustrating how the logic and computing unit 2 of FIG. 2 on the basis of the equations given above for the time differences $\Delta T_1$ and $\Delta T_2$ that respectively correspond to the horizontal and vertical phase deviations.

The adjustable threshold value K and the current selected color signal A are compared in the comparator 40. In the illustrated case, it may be assumed that all the inputs K, A, C and B of the logic circuit 2 are in parallel bit form, and are changed to the succeeding value in the case of A and B at sampling intervals and in the case of C at television line intervals. The output signal of the $S_d$ of the comparator 40 may have only a single value while the threshold K is exceeded by the signal A as in FIG. 1(b) of U.S. Pat. No. 4,403,245.

The subtraction circuit 41 produces the difference between the selected color signal A and the selected color signal C, which is then inverted in the inverter 42 and supplied to the multiplier 43.

The subtraction circuit 51 produces a signal representing the amount by which the signal A exceeds the threshold K and that signal is multiplied in the multiplier 43 to provide the vertical time or phase correction signal $K_y$. This signal changes every sampling interval, but as already explained, its value following the appearance of the provisional switching signal $S_d$ is stored in the D register 17 of FIG. 2 until the disappearance of the signal $S_d$ causes the EX-OR gate 19 to release the D register 17.

Similarly, the signal B is subtracted from the signal A in the subtraction circuit 61 and the resulting difference is inverted in the inverter 62 and then supplied to the multiplier 63, where it is multiplied by the output of the subtraction circuit 51 to produce the horizontal correction value $K_x$. As already explained in connection with FIG. 2, following the appearance of the signal $S_d$, a EX-OR gate 8 causes the D register to store the value of $K_x$ then presented by the logic circuit 2.

The signals $C_k$ shown in FIG. 2 and 3 are clock pulses of the sampling frequency.

Although the invention has been described with reference to a particular illustrative example, it will be understood that variations and modifications are possible within the inventive concept.

I claim:

1. Circuit for time correction of a provisional digital switching signal ($S_d$) produced from comparison of a digital selected color signal with a signal threshold value providing a constant (K) comprising:

means for continuously deriving a horizontal time correction signal ($K_x$) according to the formula $$K_x = T_a \frac{A - K}{A - B},$$

wherein $T_a$ is the sampling interval of said digital selected color signal, K is said threshold value, A is the value of said digital selected color signal in a pixel immediately following a change in the value of said digital switching signal and B is the value of said digital selected color signal in a pixel preceding by one sampling interval the pixel having said value A;

means for continuously deriving a vertical time correction signal ($K_y$) according to the formula $$K_y = T_h \frac{A - K}{A - C},$$

wherein $T_h$ is the line scanning interval and C is the value of said digital selected color signal in a pixel preceding by one line scanning interval the pixel having said value A;

first sample and hold storage means (16) for storing said horizontal time correction signal ($K_x$) having its loading timed in response to the presence of one and only one of (a) said provisional digital switching signal ($S_d$) and (b) said provisional switching signal delayed by one sampling interval;

second sample and hold storage means (17) for storing said vertical time correction signal ($K_y$) having its loading timed in response to the presence of one and only one of (a) said provisional digital switching signal ($S_d$) and (b) said provisional switching signal delayed by one line scanning interval;

first switching signal modifying means (19) supplied with said vertical time correction signal ($K_y$) by said second sample and hold storage means for utilizing said provisional digital switching signal substantially undelayed and also as delayed by successive line scanning intervals, in all cases having an additional delay not exceeding a sampling interval, for producing a time distributed vertically corrected digital switching signal ($S_y$); and second switching signal modifying means (18) having as input said time distributed vertically corrected digital switching signal ($S_y$) produced by said first switching signal modifying means and being supplied with said horizontal time correction signal $K_x$ by said first sample and hold storage means through signal delay means for compensating the median delay of said first switching signal modifying means, for utilizing said time-distributed vertically corrected digital signal ($S_y$) substantially undelayed and also as delayed by successive sampling intervals for producing a time-distributed vertically and horizontally corrected switching signal ($S_{xy}$).

2. Circuit according to claim 1, wherein means (22) are provided for delaying said provisional digital switching signal by one sampling interval before supply thereof to said first switching signal modifying means.

3. Circuit according to claim 2 wherein said vertical time correction signal ($K_Y$) is supplied directly from said second sample and hold storage means (17) to said first switching signal modifying means (19) and said horizontal time correction signal ($K_X$) is supplied to said second switching signal modifying means (18) through means producing a signal delay of one line scanning interval, and wherein said first switching signal modifying means utilizes only two successive delays of one line scanning interval each for producing said time-distributed vertically corrected switching signals ($S_y$).

4. Circuit for producing time-corrected vertically and horizontally distributed digital switching signals for blending foreground color television digital signals with a background color television signal, comprising means for producing a provisional digital switching signal by comparison of a digital selected color signal with a threshold value signal and for producing a sampling interval delayed switching signal and a line delayed switching signal;

means for continuously producing horizontal and vertical time correction signals ($K_x$), ($K_y$) from present and from horizontally and vertically previous samples;

first means for storing values of said horizontal time correction signal, by entering stoage thereof at the current value thereof at intervals determined by the presence of only one of said provisional digital switching signal said sampling interval delayed switching signal;

second means for storing values of said vertical time correction signal by entering storage thereof at the current value thereof at intervals determined by the presence only one of said provisional digital switching signal said line delayed switching signal; series connected first and second nonrecursive filtering means, one of them for horizontal and the other for vertical distribution of signals derived from said provisional switching signal and respectively supplied with said horizontal and vertical time correction signals from the corresponding storing means, for producing time-distributed and time-corrected digital switching signals blending said foreground television signals with said background television signals.

5. Circuit according to claim 4, wherein said nonrecursive filtering means for vertical distribution of said derived signals precedes in said series connection said nonrecursive filtering means for horizontal distribution of said derived signals.

* * * * *